Feb. 21, 1928.
J. H. POCHA
1,659,701
HOG CATCHER
Filed Sept. 9, 1924
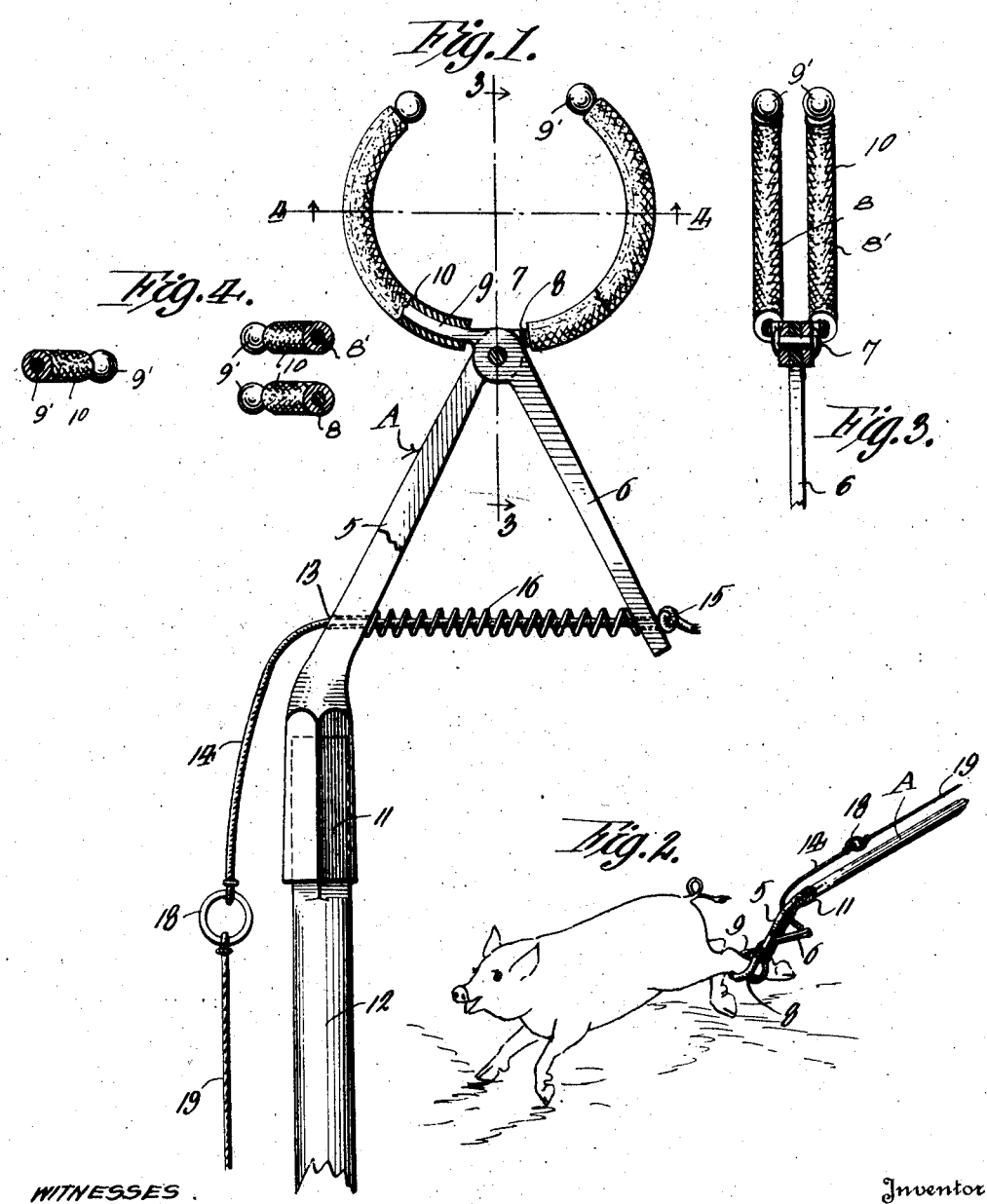
WITNESSES
Inventor
JOSEPH H. POCHA
By Richard B. Owen
Attorney Patented Feb. 21, 1928.

1,659,701

UNITED STATES PATENT OFFICE.

JOSEPH H. POCHA, OF PRINCE ALBERT, SASKATCHEWAN, CANADA.

HOG CATCHER.

Application filed September 9, 1924. Serial No. 736,671.

This invention relates to means for facilitating the catching and handling of domestic animals and the primary object of the invention is to provide means carried by the end of a pole which can be readily inserted through the bars of an animal pen for gripping and holding the leg of an animal, said gripping means being operated by the user of the pole from the inner end thereof.

A further object of this invention is to provide a hog catching device embodying a pair of arcuate gripping jaws pivotally associated together, the jaws carrying independent operating handles and one of the same being provided with a socket for receiving the end of a manipulating pole, the other jaw handle having means connected thereto for permitting the operation thereof from the grip portion of said handle.

A still further object of the invention is to provide an improved hog catching device of the above character, which will be durable and efficient in use, one that will be simple and easy to manufacture, and one which can be placed upon the market at a small cost.

With these and other objects in view, the invention consists in the novel construction, arrangement, and formation of parts, as will be hereinafter more specifically described, claimed, and illustrated in the accompanying drawings, in which drawings:

Figure 1 is an elevation of the improved device, showing parts thereof in section and broken away, Figure 2 is a perspective view of the improved device showing the same in use, Figure 3 is a detail vertical section taken on the line 3—3 of Figure 1 looking in the direction of the arrows, Figure 4 is a detail section taken on the line 4—4 of Figure 1 looking in the direction of the arrows.

Referring to the drawings in detail, wherein similar reference characters designate corresponding parts throughout the several views, the letter A generally indicates the improved device, which comprises a pair of normally diverging handles 5 and 6 which are connected together at the forward end by means of a pivot pin 7. The forward terminal of the handle 5 has formed integrally therewith outwardly extending spaced parallel arcuate leg gripping jaws 8 and 8' and the handle 6 has formed thereon a similar jaw 9. If so desired these jaws can be covered by suitable rubber tubing 10 in order to prevent injury to the animal during the catching thereof and the free terminals of the jaws are provided with knobs 9' in order to hold the tubing 10 in place. As shown the handle 5 is relatively longer than the handle 6 and has the rear end thereof provided with an angularly extending socket 11 for reception of a relatively long manipulating pole 12. The handle 5 is also provided with a guide opening 13 through which is slidably extended an operating cord or cable 14. The forward end of the cable is attached as at 15 to the rear end of the handle 6 and a spring 16 is coiled about the said cable between the handles 5 and 6 in order to normally maintain the jaws 8 and 9 in an open non-animal gripping position. The cable 14 is connected through the medium of a ring 18 with a pull cord 19 which can extend to the grip portion of the handle.

In use of the improved device the manipulating handle or pole 12 is grasped at the rear end thereof and the forward end of the device inserted through the bars of the cage which houses the animal that is to be caught. The pole is so manipulated as to position the jaws 8 and 8' about the leg of the animal, preferably the rear leg, after which the pull cord 19 is forced rearwardly which will of course bring the jaws 8, 8' and 9 together into gripping engagement with the leg of the animal. The animal can now be readily held and grasped by the operator of the device. If so desired the device itself can be used for raising the animal to an elevated position by simply removing the pole and connecting the ring 18 to a suitable hoisting device.

Changes in details may be made without departing from the spirit or the scope of this invention, but:—

What I claim as new is:—

An animal catching device comprising a pair of normally diverging handles pivotally connected together at their forward ends, a pair of outwardly extending substantially semicircular gripping jaws formed on the forward end of one handle, an angularly extending socket formed on the rear end of the mentioned handle, a single outwardly extending substantially semicircular gripping jaw formed on the other handle disposed between the pair of gripping jaws, a pole detachably fitted in the socket, a pull cable connected to the rear end of the other handle and extending through the first mentioned handle, a spring coiled about said cable and positioned between said handles for normally holding the jaws in an open separated position, holding knobs formed on the outer ends of the jaws, and friction gripping sleeves fitted upon the jaws formed of compressible material and arranged between the knobs and the handles.

In testimony whereof I affix my signature.

JOSEPH H. POCHA.